(12) United States Patent
Mazur et al.

(10) Patent No.: US 7,973,947 B2
(45) Date of Patent: Jul. 5, 2011

(54) UBIQUITOUS INSTALLATION AND REMOVAL OF RIP CAPABILITIES FROM PDL FILES

(75) Inventors: Chris Mazur, Henrietta, NY (US); Javier Morales, Irondequoit, NY (US)

(73) Assignee: Xerox Corporation, Norwalk, CT (US)

( * ) Notice: Subject to any disclaimer, the term of this patent is extended or adjusted under 35 U.S.C. 154(b) by 1686 days.

(21) Appl. No.: 11/234,605

(22) Filed: Sep. 22, 2005

(65) Prior Publication Data
US 2007/0070378 A1    Mar. 29, 2007

(51) Int. Cl.
*G06F 3/12*    (2006.01)
*G06F 17/00*    (2006.01)

(52) U.S. Cl. ........ 358/1.13; 358/1.15; 358/1.1; 715/276
(58) Field of Classification Search .................. None
See application file for complete search history.

(56) References Cited

U.S. PATENT DOCUMENTS

| | | | |
|---|---|---|---|
| 6,205,452 B1 * | 3/2001 | Warmus et al. | 715/246 |
| 6,662,270 B1 | 12/2003 | Sans et al. | 711/118 |
| 2005/0044494 A1 | 2/2005 | Barnes et al. | 715/531 |
| 2005/0157321 A1 * | 7/2005 | Alacar | 358/1.13 |

OTHER PUBLICATIONS

Xerox Corporation Variable Data Intelligent PostScript PrintWare (VIPP) Reference Manual Version 5.0 Sep. 2003 721P83359 pp. 2-1, 9-2, 9-10, 9-12, 11-238, 11-5, 13-2.*

* cited by examiner

*Primary Examiner* — Twyler L. Haskins
*Assistant Examiner* — Barbara D Reinier
(74) *Attorney, Agent, or Firm* — Kermit D. Lopez; Luis M. Ortiz; Ortiz & Lopez, PLLC

(57) ABSTRACT

A job can be used to produce a printed document by first processing it with a digital front end (DFE) which then sends printing information to a marking engine. A job has required functionality and a DFE has supplied functionality. When the supplied functionality does not include the required functionality, the job must be modified or abandoned. When using certain DFEs, the job can be modified to include programming data. When processing the modified job, the DFE gains functionality through changed programming. The DFE then has sufficient functionality, which contains the required functionality, that it can process the modified job.

15 Claims, 3 Drawing Sheets

Modified PDL File
201

Header Information
202

Commands for Installing Sufficient Functionality
203

Body Information
204

Commands for Uninstalling Sufficient Functionality
205

Footer Information
206

*Fig. 2*

UBIQUITOUS INSTALLATION AND REMOVAL OF RIP CAPABILITIES FROM PDL FILES

TECHNICAL FIELD

Embodiments relate to printing, printing equipment, and printing subsystems. Embodiments also relate to raster image processing and digital front ends. Embodiments additionally relate to page description languages, language interpreters, and downloading interpreter functionality into a digital front end.

BACKGROUND

In modern printing environments, different functional parts of the printing process are commonly divided amongst different subsystems. For example, print jobs can be stored or produced by a job source. A job can be submitted to a digital front end (DFE) that processes the job and then passes it to a marking engine where it is actually printed. One of the processing functions performed by the DFE is known as raster image processing (RIP) in which a document description is transformed into an image that can be printed by a marking engine. An image is a two dimensional pattern of pixels that the marking engine can directly print whereas the document description can contain text and graphics.

A page description language (PDL) can be used to describe a document. A PDL can tell a DFE about the placement and appearance of text and images on a page. The appearance of a printable element, such as text, can include color, font, size, and other factors. A job, therefore, is often presented to the DFE as a PDL file. PostScript™ is an example of an early PDL. A file, such as a file stored in a computer, containing PostScript is a PDL file. Variable Data Intelligent Postscript Printware (VIPP) is a more recent PDL. VIPP is a licensable language from Xerox that enables high performance output of variable-data PostScript documents. VIPP is discussed in U.S. Pat. No. 6,662,270 and in United States Patent Application 20050044494.

Many DFEs, however, do not have VIPP functionality. As such, a PDL file containing VIPP can not be processed by every DFE. PDL files containing the PostScript™ SetPageDevice command have the same problem because all DFEs do not support SetPageDevice functionality.

A common occurrence is when none of the available DFEs have the required functionality for a particular job. A person then must choose between taking the job elsewhere, waiting for the right DFE to become available, giving up, or adapting the job for an available DFE. This occurrence can happen when a PDL file contains advanced capabilities such as VIPP or SetPageDevice. A need therefore exists for systems and methods that can adjust jobs, such as PDL files, for people without interfering with other people who want to print documents.

BRIEF SUMMARY

Aspects of the embodiments address limitations and flaws in the prior art by modifying a job to provide needed functionality to the digital front end (DFE).

It is therefore an aspect of the embodiments to provide a marking engine, DFE, and a job source. The job source can store or produce jobs that are submitted to the DFE, processed, and then passed to the marking engine. Every job has a required functionality and every DFE has a supplied functionality. If the supplied functionality includes the required functionality, then the DFE can process the job. If the supplied functionality does not include the required functionality, then the DFE needs something more in order to process the job. A DFEs supplied functionality includes details such as available storage and available memory because such details impact the ability of a DFE to process a job. Similarly, a jobs functionality can include required storage or memory.

It is also an aspect of the embodiments that a supplied functionality description can describe all or part of the supplied functionality. For example, a DFE can contain a data file describing the DFE's supplied functionality. Similarly, a required functionality description can describe the required functionality. For example, a required functionality module can inspect a job and produce a required functionality description for that job.

It is another aspect of the embodiments that a job modification module can compare the required functionality description and the supplied functionality description to determine if the DFE can process the job and, if not, determines the functionality that the DFE lacks. The job modification module then produces a modified job that the DFE can process. In some cases, the DFE is too limited to process the job or a modified job. For example, some DFEs will not have enough memory to process the modified job. In such cases, a modified job should not be produced by the job modification module or sent to the too limited DFE.

It is a further aspect of the embodiments that a modified job, when processed by a DFE, adds functionality to the DFE. When the DFE begins processing the modified job, the DFE's has only its own supplied functionality. As the job is processed, however, the DFE's functionality is increased to a sufficient functionality where the sufficient functionality contains the required functionality. A DFE's supplied functionality is determined by the DFE's programming. Many DFE's can download programming data that, when processed, changes the DFE's programming and supplied functionality. Some DFEs can receive programming data within a job.

For example, a job, such as a PDL file, can contain VIPP instructions. The job modification module can create a modified job that contains the job plus some programming data. When a DFE with no VIPP capability processes the modified job, the DFE gains enough VIPP capability to complete the processing. The programming data can include an installer that installs part of, or even all of, a VIPP interpreter. An interpreter, as is well known by those practiced in the art of computer programming, is a program module that can execute a series of instructions.

An aspect of certain embodiments is to contain an uninstaller as programming data within the modified job. On processing the modified job, the DFE gains functionality. The new functionality, however, can interfere with later users of the DFE who expect merely the required functionality. The uninstaller removes the new functionality from the DFE so that the later users can confidently submit their jobs to the DFE and get their expected results.

It is also an aspect of certain embodiments to produce a modified job when the PDL is PostScript™ and the required functionality includes processing SetPageDevice commands.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

FIG. 2 illustrates a high level block diagram of a modified PDL file in accordance with aspects of the embodiments.

DETAILED DESCRIPTION OF THE INVENTION

The particular values and configurations discussed in these non-limiting examples can be varied and are cited merely to illustrate embodiments and are not intended to limit the scope of the invention.

Figure 1:
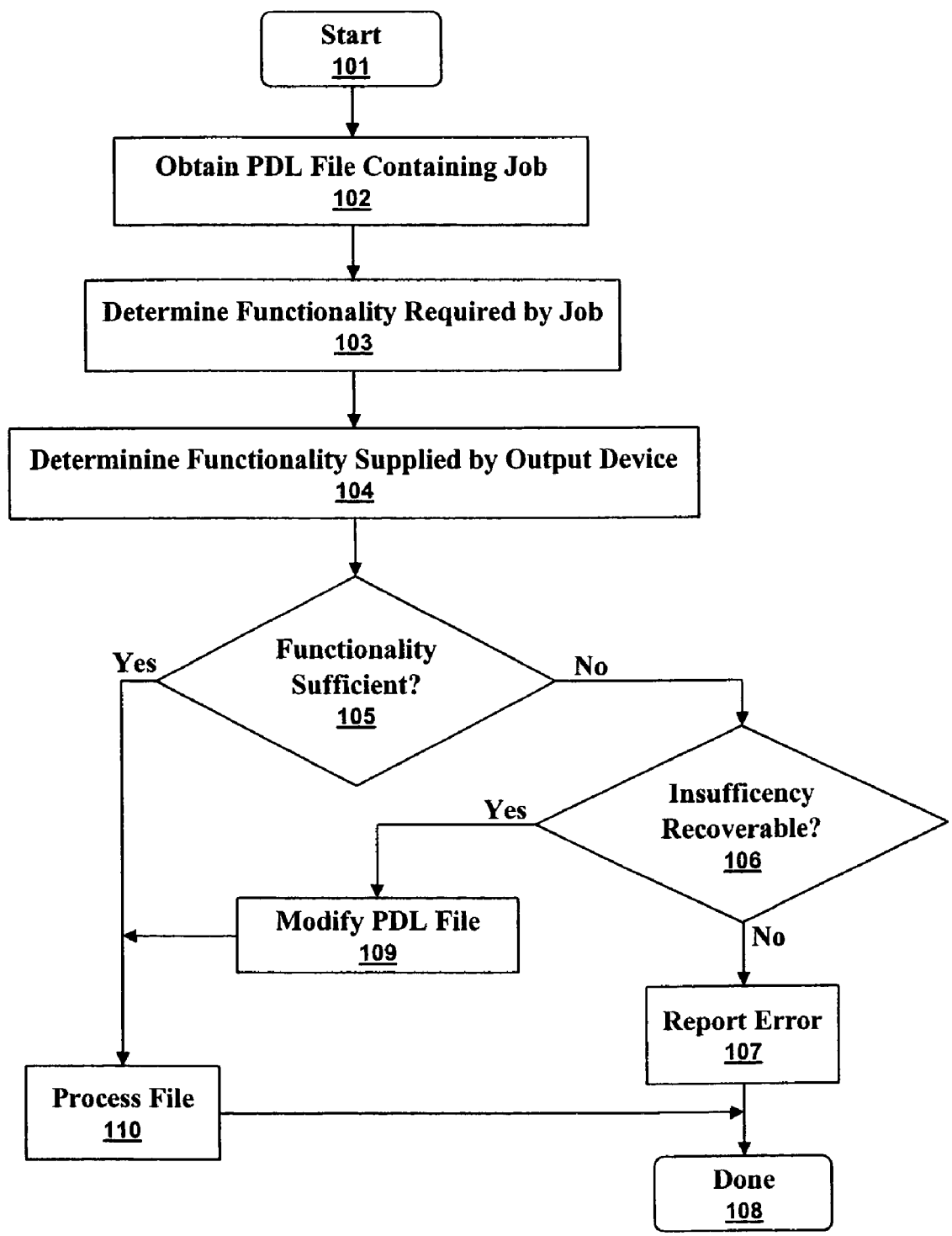
FIG. 1 illustrates a high level flow diagram of modifying a PDL file in accordance with aspects of the embodiments.

FIG. 1 illustrates a high level flow diagram of modifying a PDL file in accordance with aspects of the embodiments. After the start 101, a PDL file containing a job is obtained 102. The required functionality for processing the job is determined 103 and the supplied functionality provided by a DFE is determined 104. If the supplied functionality includes the required functionality 105, the file is processed 110 and the process completes 108. Otherwise, if the disparity in functionality can be corrected 106 then a modified job is produced 109, processed 110, and the process completes 108. If the disparity in functionality cannot be corrected 106 then an error is reported 107 and the process completes 108.

FIG. 2 illustrates a high level block diagram of a modified PDL file 201 in accordance with aspects of the embodiments. The modified PDL file 201 contains header information 202, body information 204, and footer information 206 that can be transcribed, probably without modification, from the original PDL file. Commands for installing sufficient functionality 203 are programming data, as discussed above, which can change the DFE's programming. Commands for uninstalling sufficient functionality 205, also discussed above, can return the DFE to its earlier level of programming.

The modified PDL file of FIG. 2 shows one possible arrangement of file information and is not intended as a limitation. Those skilled in the arts programming, file formats, or data manipulation can easily come up with an infinite number of arrangements. For example, numerous blocks of programming data, body information, and uninstalling commands can be placed throughout a modified PDL file. Header and footer information is not required of all files. Regardless of the arrangement of information, a modified PDL file is essentially a rewriting of a PDL file with the intention of producing a document on a certain DFE.

In certain cases, a modified PDL files can contain no commands for installing sufficient functionality. These cases arise when a command in the PDL file is translated to an equivalent command in the modified PDL file. Such a translation does not add functionality to the DFE. It is simply a translation. The supplied functionality can specify the commands the DFE can process and a modification module can produce translations of PDL file commands that the DFE can not process. Obviously, some modified PDL files can contain both translations as well as programming data that change DFE functionality.

Figure 3:
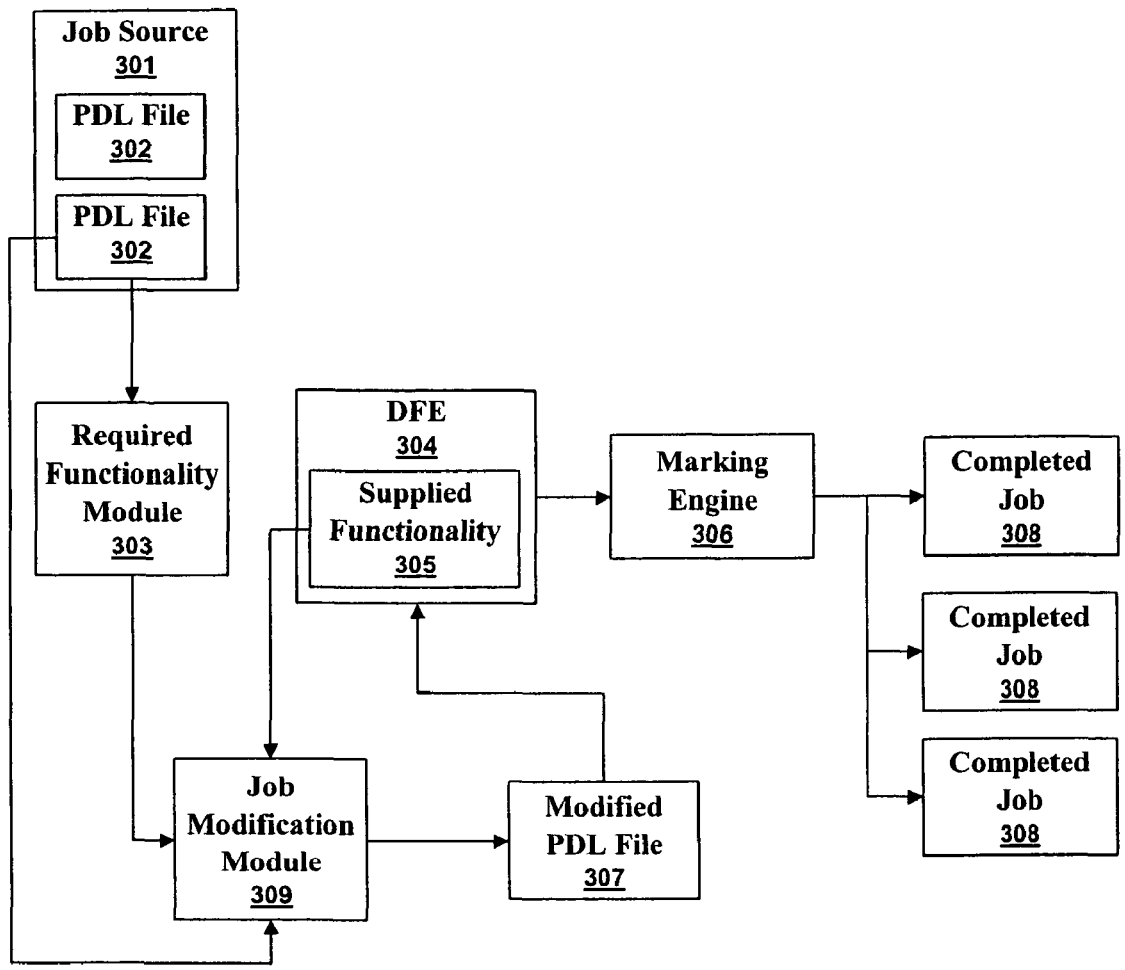
FIG. 3 illustrates a high level block diagram of a system for processing jobs in accordance with aspects of the embodiments.

FIG. 3 illustrates a high level block diagram of a system for processing jobs in accordance with aspects of the embodiments. A job source 301 is shown containing two PDL files 302. A PDL file 302 can be passed to a required functionality module 303 to find the required functionality. A DFE 304 has supplied functionality 305. A job modification module 309 compares the required functionality and the supplied functionality and produces a modified PDL file 307 based on the PDL file 302. The modified PDL file is processed by the DFE 304 which passes printing information to a marking engine 306. The marking engine uses the printing information to produce completed jobs 308.

As discussed above, the supplied functionality includes all aspects of a DFEs job processing capability and a supplied functionality description can contain some or all of the supplied functionality. A job modification module can use aspects of the supplied functionality description to select different job modification solutions. For example, a DFE having constrained memory could require a solution that preserves memory but requires more processing time. If every job modification solution consumes too much DFE memory, then the DFE does not have a sufficient functionality for processing the PDL file or any modified PDL file based on the PDL file.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules, hardware modules, or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system comprising:
    a marking engine;
    a digital front end having a supplied functionality description of the digital front end;
    a job source that stores or produces a job;
    a required functionality module that specifies a required functionality description for processing the job; and
    a job modification module that produces a modified job based on the job, the required functionality description, and the supplied functionality description wherein the modified job includes blocks of programming data, body information, and uninstalling commands to increase the digital front end functionality to a sufficient functionality.

2. The system of claim 1 wherein the job comprises one or more VIPP instruction.

3. The system of claim 2 wherein the modified job comprises a VIPP interpreter installer that installs an interpreter of VIPP instructions in the digital front end.

4. The system of claim 3 wherein the modified job further comprises an uninstaller wherein the uninstaller uninstalls the interpreter of VIPP instructions from the digital front end.

5. The system of claim 1 wherein the job comprises one or more SetPageDevice instruction.

6. A system comprising:
a marking engine;
a digital front end having a supplied functionality description of the digital front end;
a job source that stores or produces a job wherein a page description language specifies the job;
a required functionality module that specifies a required functionality description for processing the job; and
a job modification module that produces a modified job based on the job, the required functionality description, and the supplied functionality description wherein the modified job includes blocks of programming data, body information, and uninstalling commands to increase the digital front end functionality to a sufficient functionality.

7. The system of claim 6 wherein the job comprises one or more VIPP instruction.

8. The system of claim 7 wherein the modified job comprises a VIPP interpreter installer that installs an interpreter of VIPP instructions in the digital front end.

9. The system of claim 8 wherein the modified job further comprises an uninstaller wherein the uninstaller uninstalls the interpreter of VIPP instructions from the digital front end.

10. The system of claim 6 wherein the job comprises one or more SetPageDevice instruction.

11. A non-transitory computer-readable medium having computer-executable instructions for performing steps comprising:

obtaining a PDL file that describes a job;
determining a required functionality for processing the PDL file;
determining a supplied functionality of a digital front end;
processing the PDL file if the supplied functionality contains the required functionality;
modifying the PDL file to produce a modified file when the supplied functionality does not contain the required functionality, wherein the modified file includes blocks of programming data, body information, and uninstalling commands;
processing the modified file when the supplied functionality does not contain the required functionality thereby completing the job by producing a sufficient functionality in the digital front end; and
rendering the job via a marking engine.

12. The non-transitory computer-readable medium of claim 11 wherein the PDL file comprises one or more VIPP instruction.

13. The non-transitory computer-readable medium of claim 12 further comprising installing a VIPP interpreter into the digital front end wherein the modified file comprises a VIPP interpreter installer.

14. The non-transitory computer-readable medium of claim 13 further comprising uninstalling the VIPP interpreter wherein the modified job further comprises an uninstaller.

15. The non-transitory computer-readable medium of claim 11 wherein the job comprises one or more SetPageDevice instruction.

* * * * *